(12) United States Patent
Marienfeld et al.

(10) Patent No.: US 9,366,309 B2
(45) Date of Patent: *Jun. 14, 2016

(54) ENGINE MOUNT FOR A MOTOR VEHICLE

(71) Applicant: ContiTech Vibration Control GmbH, Hannover (DE)

(72) Inventors: Peter Marienfeld, Marklohe (DE); Meinert Holst, Wunstorf (DE)

(73) Assignee: ContiTech Vibration Control GmbH, Hannover (DE)

( * ) Notice: Subject to any disclaimer, the term of this patent is extended or adjusted under 35 U.S.C. 154(b) by 27 days.

This patent is subject to a terminal disclaimer.

(21) Appl. No.: 13/905,976

(22) Filed: May 30, 2013

(65) Prior Publication Data
US 2013/0256960 A1 Oct. 3, 2013

Related U.S. Application Data

(63) Continuation of application No. PCT/EP2011/064958, filed on Aug. 31, 2011.

(30) Foreign Application Priority Data

Nov. 30, 2010 (DE) .......................... 10 2010 060 886

(51) Int. Cl.
*F16F 13/04* (2006.01)
*F16F 13/26* (2006.01)
*F16F 13/10* (2006.01)

(52) U.S. Cl.
CPC ............... *F16F 13/10* (2013.01); *F16F 13/264* (2013.01)

(58) Field of Classification Search
CPC ....... F16F 13/26; F16F 13/264; F16F 13/268; F16F 13/106; F16F 13/107
USPC .......................... 267/140.13, 140.14, 140.15
See application file for complete search history.

(56) References Cited

U.S. PATENT DOCUMENTS 4,789,142 A 12/1988 Hoying et al.
5,632,472 A * 5/1997 Kato et al. ............... 267/140.13
(Continued)

FOREIGN PATENT DOCUMENTS

| DE | 3210731 A1 | * 10/1983 | .............. F16F 15/04 |
| DE | 102008015370 A1 | * 9/2009 | |
| GB | 2269217 A | * 2/1994 | .............. F16F 13/00 |

OTHER PUBLICATIONS

International Search Report dated Nov. 18, 2011 of international application PCT/EP2011/064958.

*Primary Examiner* — Anna Momper
*Assistant Examiner* — Stephen Bowes
(74) *Attorney, Agent, or Firm* — Walter Ottesen, P.A.

(57) ABSTRACT

A switchable mount includes a partition wall which partitions a working chamber from a compensating chamber. A first diaphragm is arranged in the partition wall so as to be deflectable in the longitudinal direction of the mount. A switching actuator controls the diaphragm and, in a first state thereof, the diaphragm is fixed in a rest position and, in a second state thereof, the diaphragm is released to move in the longitudinal direction of the mount. A second diaphragm is arranged in the partition wall and is deflected in the longitudinal direction of the mount to influence the volume of the working chamber. An air chamber is arranged between the first diaphragm and the second diaphragm. In the first state of the actuator, the air chamber is closed off air-tight to the atmosphere and, in the second current-conducting state of the actuator, is connected to the atmosphere.

5 Claims, 6 Drawing Sheets

(56) References Cited

U.S. PATENT DOCUMENTS

| | | | |
|---|---|---|---|
| 5,647,579 A * | 7/1997 | Satoh | 267/140.14 |
| 5,950,756 A * | 9/1999 | Satoh et al. | 180/312 |
| 6,082,717 A * | 7/2000 | Nanno | 267/140.14 |
| 6,145,802 A * | 11/2000 | Nakagaki et al. | 267/140.14 |
| 6,186,485 B1 * | 2/2001 | Kawazoe | 267/140.14 |
| 6,199,842 B1 | 3/2001 | Gennesseaux et al. | |
| 6,234,463 B1 * | 5/2001 | Akatsu et al. | 267/140.15 |
| 6,361,031 B1 | 3/2002 | Shores et al. | |
| 2013/0161885 A1 * | 6/2013 | Marienfeld et al. | 267/140.14 |

\* cited by examiner

ENGINE MOUNT FOR A MOTOR VEHICLE

CROSS REFERENCE TO RELATED APPLICATIONS

This application is a continuation application of international patent application PCT/EP2011/064958, filed Aug. 31, 2011, designating the United States and claiming priority from German application 10 2010 060 886.6, filed Nov. 30, 2010, and the entire content of both applications is incorporated herein by reference.

FIELD OF THE INVENTION

The invention relates to a switchable, hydraulically damping mount, in particular, an engine mount for a motor vehicle.

BACKGROUND OF THE INVENTION

U.S. Pat. No. 4,789,142 describes an engine mount in which the partition wall has a bypass opening in addition to the duct through which the hydraulic fluid can flow back and forth between the working chamber and the compensation chamber. In the bypass opening there is situated a ferromagnetic diaphragm which has an upper and a lower stop as viewed in the longitudinal direction of the engine mount. Below the diaphragm and below the compensation chamber there is arranged an electromagnetic switching actuator in the form of an electrically conductive coil, via which the diaphragm can be controlled. It is thus possible for the coil to be energized in such a way that the diaphragm is situated either in its lower stop position or in its upper stop position, in which the bypass opening is closed in each case.

Furthermore, it is possible for the coil to be energized in such a way that the diaphragm assumes any desired position between the lower stop position and the upper stop position. The diaphragm then opens up the bypass opening such that hydraulic fluid can flow back and forth between the working chamber and the compensation chamber. Through targeted adjustment of the position of the diaphragm between the upper and the lower stop by means of the coil, it is furthermore possible for the volume of the working chamber to be adapted to the present demands on the engine mount.

With the hydraulic mount known from U.S. Pat. No. 4,789,142, it is possible for low-frequency vibrations to be damped by virtue of hydraulic fluid flowing back and forth via the duct between the working chamber and the compensation chamber of the engine mount. Furthermore, high-frequency vibrations which are introduced into the engine mount can thereby be kept away from the body of the motor vehicle by virtue of the bypass being opened by the ferromagnetic diaphragm and the diaphragm being actuated by the coil in such a manner that the volume of the working chamber remains approximately constant. It is however noted that the coil of the electromagnetic switching actuator must be constantly energized in order to control the diaphragm. This applies both in the situation wherein the diaphragm is to be held in the upper or the lower stop position and also in the situation wherein the diaphragm is to be held between these positions. This leads to a high electrical consumption of the electromagnetic switching actuator. It is also noted that large forces are required for the control of the diaphragm because the diaphragm is acted on by the hydraulic fluid in the working chamber. This makes it necessary to use a switching actuator which can generate large forces and which therefore takes up a large amount of installation space, which is not always available in modern motor vehicles.

SUMMARY OF THE INVENTION

It is an object of the invention to provide a switchable, hydraulically damping mount, in particular an engine mount for a motor vehicle, which can be actuated by a small switching actuator.

The object is achieved in that there is arranged in the partition wall a second diaphragm which can be deflected in the longitudinal direction of the mount and which influences the volume of the working chamber, wherein between the first diaphragm and the second diaphragm there is arranged an air chamber which is closed off in an air-tight manner with respect to the atmosphere when the switching actuator is in the deenergized state and which is connected to the atmosphere when the switching actuator is in the energized state.

The switchable mount is hardened when the air chamber is closed off in an air-tight manner with respect to the atmosphere, because in this state of the mount, the second diaphragm can move only slightly. By contrast, the switchable mount has a soft characteristic if the air chamber is connected to the atmosphere, because the second diaphragm can then move in the longitudinal direction of the mount counter to the atmospheric air pressure. If the switchable mount is used as an engine mount for a motor vehicle, the air chamber is connected to the atmosphere when vibrations when the vehicle is at idle (referred to hereinafter as idle vibrations; these arise when the engine is running, for example, when the vehicle is stopped at a red traffic signal and is at idle) act on the mount.

An advantage of the invention can be seen in the fact that the first diaphragm and the second diaphragm are decoupled from one another. This makes it possible for the first diaphragm to be controlled via small forces, because it is not exposed to the forces exerted on the second diaphragm by the compensation chamber. Accordingly, the switching actuator in the mount need generate only small forces, and can be of small design.

In an embodiment of the invention, the first diaphragm is a constituent part of the rolling diaphragm which delimits the volume of the compensation chamber to the outside. An advantage of this embodiment can be seen in the fact that the first diaphragm can be introduced, as a single component with the rolling diaphragm, into the mount, which simplifies the production of the mount. A further advantage of the embodiment can be seen in the fact that a rolling diaphragm with an integrated first diaphragm can be produced at low cost.

A further embodiment of the invention is characterized in that:

the mount has at least one ventilation slot via which the air chamber can be connected to the atmosphere, and in that the first diaphragm has at least one window via which the air chamber can be connected to the ventilation slot, and in that, when the switching actuator is in the deenergized state, the first diaphragm bears with an annular sealing lip against a sealing seat in such a way that the connection for the air situated in the air chamber from the window to the ventilation slot is blocked.

An advantage of this embodiment can be seen in the fact that the damping characteristic of the mount in the high-frequency range can be set by the cross section of the ventilation slots.

In a further embodiment of the invention, the at least one ventilation slot runs radially at the outside on the pot of the switching actuator. An advantage of this embodiment can be seen in the fact that the ventilation slots are situated in the direct vicinity of the switching actuator, such that they can be separated from the window of the first diaphragm in a simple manner by the sealing lip.

In an embodiment of the invention, the total cross-sectional area of the windows is larger than the total cross-sectional area of the ventilation slots. In this way, the first diaphragm is reliably prevented from being pressed against the sealing seat by the air flow when the air escapes from the air chamber into the atmosphere via the windows and the ventilation slots.

In an embodiment of the invention, the first diaphragm is ferromagnetic and the switching actuator is an electromagnetic switching actuator. An advantage of this embodiment can be seen in the fact that electromagnetic actuators via which a ferromagnetic diaphragm can be controlled are available as standard components and are of compact construction.

In an embodiment of the invention, the switching actuator is formed such that, in the deenergized state, it exerts a magnetic holding force on the diaphragm and fixes the diaphragm in a rest position, and in the energized state, it reduces the magnetic holding force to such an extent that the diaphragm is released for a movement in the longitudinal direction of the mount. An advantage of the invention is to be considered to be that of the electromagnetic switching actuator and thus the switchable mount having only a low electrical consumption. This can be understood by considering the following: vibrations during driving operation of the vehicle are damped via the switchable mount by virtue of hydraulic fluid flowing back and forth via the duct between the working chamber and the compensation chamber. Idle vibrations which act on the mount are by contrast influenced via the first diaphragm which, for this purpose, must be freely movable in the longitudinal direction of the mount. During normal driving operation, freedom of movement of the first diaphragm is not required, such that the diaphragm may be fixed in its rest position. According to an embodiment of the invention, the electromagnetic switching actuator then requires no electrical current. Rather, the electromagnetic switching actuator requires electrical current only when idle vibrations act on the engine mount.

An embodiment of the invention is characterized in that the switching actuator includes the following constituent parts:
  a permanent magnet;
  ferromagnetic elements; and,
  an electrically conductive coil through which an electrical current flows when the switching actuator is in the energized state.

The above constituent parts of the switching actuator are arranged relative to one another such that, when the switching actuator is in the deenergized state, the magnetic flux originating from the permanent magnet is conducted via the ferromagnetic elements through the diaphragm, such that the diaphragm is attracted by the holding force exerted by the permanent magnet, and that, when the switching actuator is in the energized state, the magnetic flux originating from the permanent magnet is diverted in such a way that the magnetic flux is not conducted through the diaphragm, such that the holding force exerted by the permanent magnet is reduced to such an extent that the diaphragm is released for a movement in the longitudinal direction of the mount.

An advantage of this embodiment can be seen in the fact that the diaphragm can be securely fixed in its rest position via the permanent magnet because a large magnetic force can be exerted on the diaphragm by means of the permanent magnet. A further advantage of the embodiment is that the switching actuator has a small structural volume, because an adequately large magnetic force can be exerted on the diaphragm by means of only a small permanent magnet.

A further embodiment of the invention is characterized in that the switching actuator includes the following constituent parts:
  a pot which is made of ferromagnetic material and on the base of which the permanent magnet is arranged in such a manner that the magnetic field in the permanent magnet points in the longitudinal direction of the pot; and,
  a ferromagnetic core which is arranged above the permanent magnet, the longitudinal axis of which points in the longitudinal direction of the pot and around the longitudinal axis of which the coil is wound, wherein an air gap remains between the pot and the core.

The switching actuator is aligned in the mount in such a way that the coil is situated between the diaphragm and the permanent magnet and the longitudinal direction of the pot runs parallel to the longitudinal direction of the mount.

An advantage of this embodiment is that the switching actuator has a compact construction.

In an embodiment of the invention, the air gap between the pot and the core is sealed by an electrically insulating sealing compound. An advantage of this embodiment is that the coil is fixed securely in its position in the switching actuator by the sealing compound. A further advantage of the invention is that the constituent parts of the switching actuator are protected against environmental influences by the sealing compound.

In another embodiment of the invention, the switching actuator is arranged on that side of the partition wall which faces away from the working chamber. An advantage of this embodiment is that the switching actuator is arranged outside the working chamber, and thus the volume of the working chamber is not reduced by the switching actuator.

In a further embodiment of the invention, the diaphragm is embedded in rubber. An advantage of this embodiment is that the diaphragm does not generate any noises when it abuts against other constituent parts of the switching actuator, for example against the partition wall.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
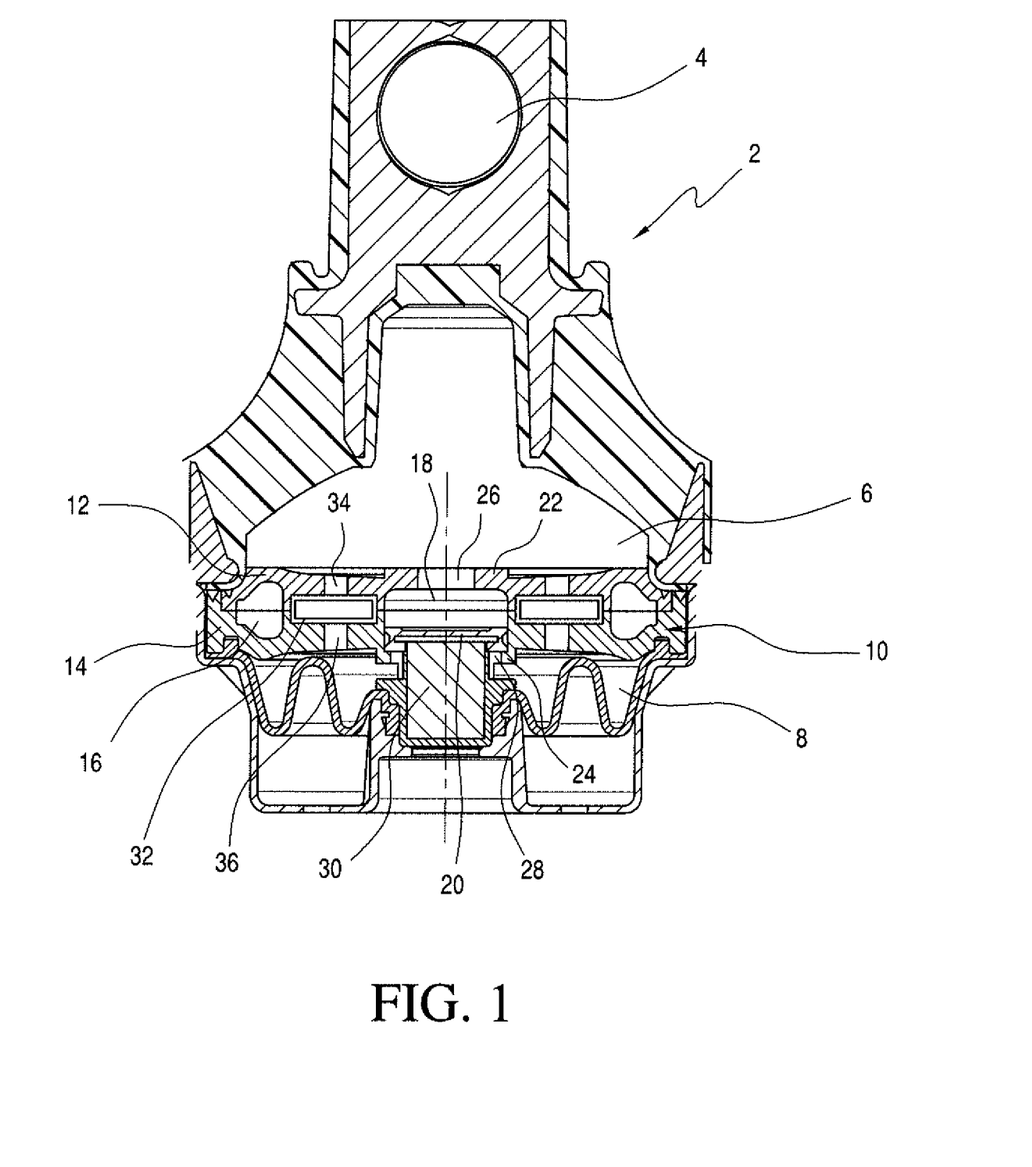
FIG. 1 shows a switchable mount.

FIG. 1 is a schematic of a switchable, hydraulically damping mount in the form of a switchable engine mount for a motor vehicle. The engine mount 2 is rotationally symmetrical about its longitudinal axis and includes a lug 4 on which the engine of a motor vehicle is suspended. Furthermore, the engine mount 2 includes a working chamber 6 and a compensation chamber 8 which are each filled with hydraulic fluid and which are separated from one another by a partition wall 10. The partition wall 10 is made of an upper part 12 and of a lower part 14 and includes an annular duct 16 via which the working chamber 6 is connected to the compensation chamber 8. Furthermore, the partition wall 10 comprises a bypass duct 18. A disc-shaped diaphragm 20 made of iron or some other ferromagnetic material is situated in the bypass duct 18. The cross section of the diaphragm 20 corresponds to the cross section of the bypass duct 18. The diaphragm 20 is arranged in the partition wall 10, more specifically, in the bypass duct 18 in such a manner that it can be deflected in the longitudinal direction of the mount. Here, the freedom of movement of the diaphragm 20 in the upward direction (that is, in the direction toward the working chamber) is delimited by a stop 22 on the upper part 12. Furthermore, the freedom of movement of the diaphragm in the downward direction (that is, in the direction toward the compensation chamber 8) is delimited by a stop 24 on the lower part 14. That surface of the diaphragm 20, which faces toward the working chamber 6, communicates with the hydraulic fluid in the working chamber 6 via the opening 26 in the upper part 12. Furthermore, the underside of the diaphragm 20 communicates with the hydraulic fluid in the compensation chamber 8 via an annular duct 28.

In addition to the constituent parts already referred to, the engine mount also includes an electromagnetic switching actuator 30 by means of which the ferromagnetic diaphragm 20 can be switched. The switching actuator 30 is arranged under the diaphragm 20 on that side of the partition wall 10 which faces away from the working chamber 6. This switching actuator is designed such that, in the deenergized state, it exerts a magnetic holding force on the diaphragm 20 and fixes the diaphragm 20 in a rest position. In the engine mount 2 shown in FIG. 1, the diaphragm 20 bears, in its rest position, against the stop 24 on the lower part 14 of the partition wall 10, such that the bypass duct 18 is blocked. Furthermore, the switching actuator 30 is designed such that, in the energized state, it reduces the magnetic holding force to such an extent that the diaphragm 20 is released for a movement in the longitudinal direction of the engine mount 2. The diaphragm 20 can then move freely between the stop 22 and the stop 24, and opens up the bypass duct 18.

In addition to the constituent parts already mentioned, the engine mount 2 includes an annular decoupling diaphragm 32 which is situated between the upper part 12 and the lower part 14 of the partition wall 10 and which surrounds the magnetic diaphragm 20. The top side of the decoupling diaphragm 32 is acted on, through windows 34 in the upper part 12, by the hydraulic fluid in the working chamber 6. The underside of the decoupling diaphragm 32 is acted on, through windows 36 in the lower part 14, by the hydraulic fluid in the compensation chamber 8.

The mode of operation of the switchable engine mount is as follows: if, during normal driving operation, vibrations are introduced into the engine mount 2 by the engine (not shown), hydraulic fluid is transferred from the working chamber 6 into the compensation chamber 8 (or in the opposite direction) via the annular duct 16. Here, as a result of the throttling action of the annular duct 16, the vibrations introduced into the mount are damped. While these vibrations are being introduced, the diaphragm 20 is fixed in its rest position by the switching actuator 30 and assumes the position shown in FIG. 1. The bypass duct 18 is then closed. For idle vibrations with frequencies higher than those of the vibrations occurring during normal driving operation, the annular duct 16 is dynamically closed off such that then no hydraulic fluid can be transported back and forth between the working chamber 6 and the compensation chamber 8. While idle vibrations are being introduced into the engine mount 2, the switching actuator 30 is switched into the energized state, such that the magnetic holding force of the switching actuator 30 is reduced to such an extent that the diaphragm 20 is released for a movement in the longitudinal direction of the engine mount 2. The introduced idle vibrations are then compensated in that the volume of the working chamber 6 is held constant by means of a movement of the diaphragm 20 in the bypass duct 18. This is realized by virtue of the diaphragm 20 in the bypass duct 18 moving freely up and down (this means that the diaphragm 20 is moved up and down only by the pressure exerted on the diaphragm 20 by the hydraulic fluid in the working chamber 6 and in the compensation chamber 8; when the switching actuator 30 is in the energized state, the movement of the diaphragm 20 in the bypass duct 18 is not influenced by the switching actuator).

Vibrations at other frequencies which are introduced into the engine mount 2 can be compensated in a manner known per se by means of the decoupling diaphragm 32.

Figure 2A:
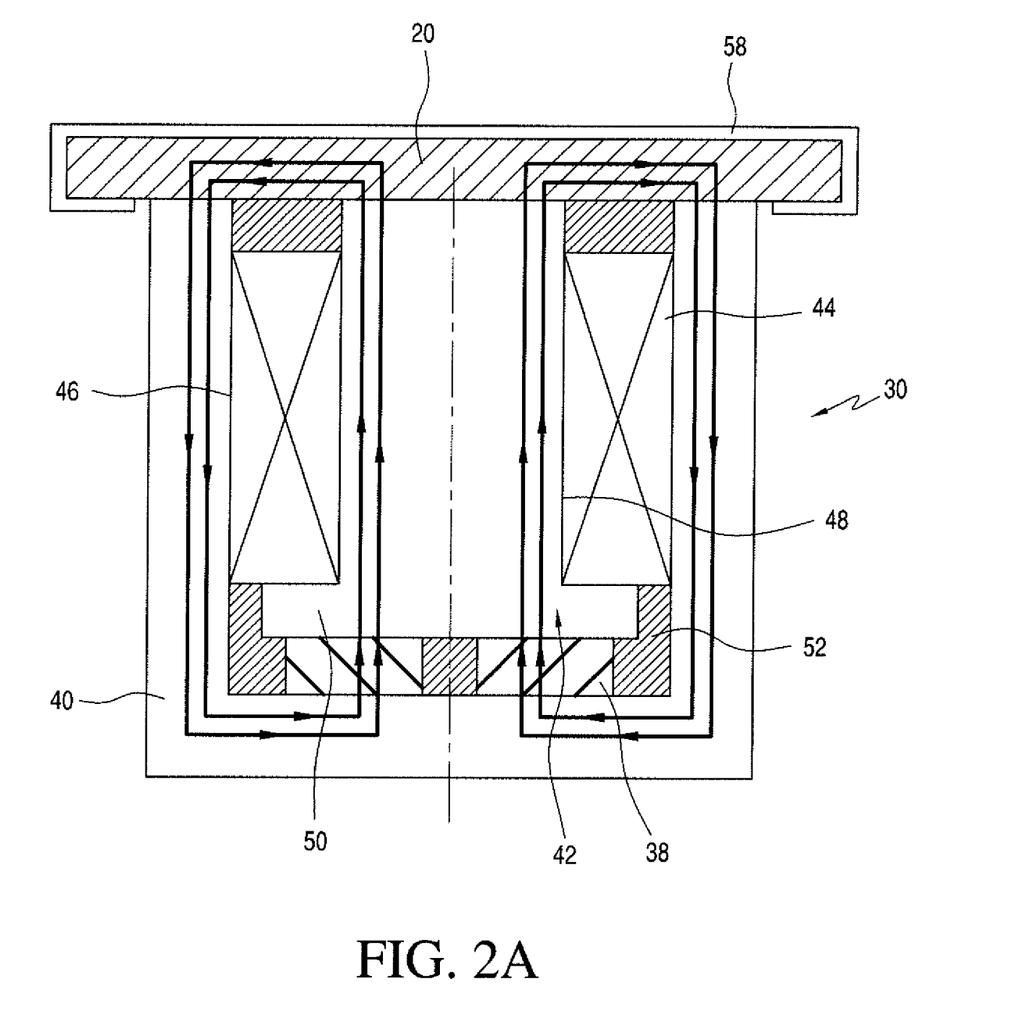
FIGS. 2A and 2B show the switching actuator.
Figure 2B:
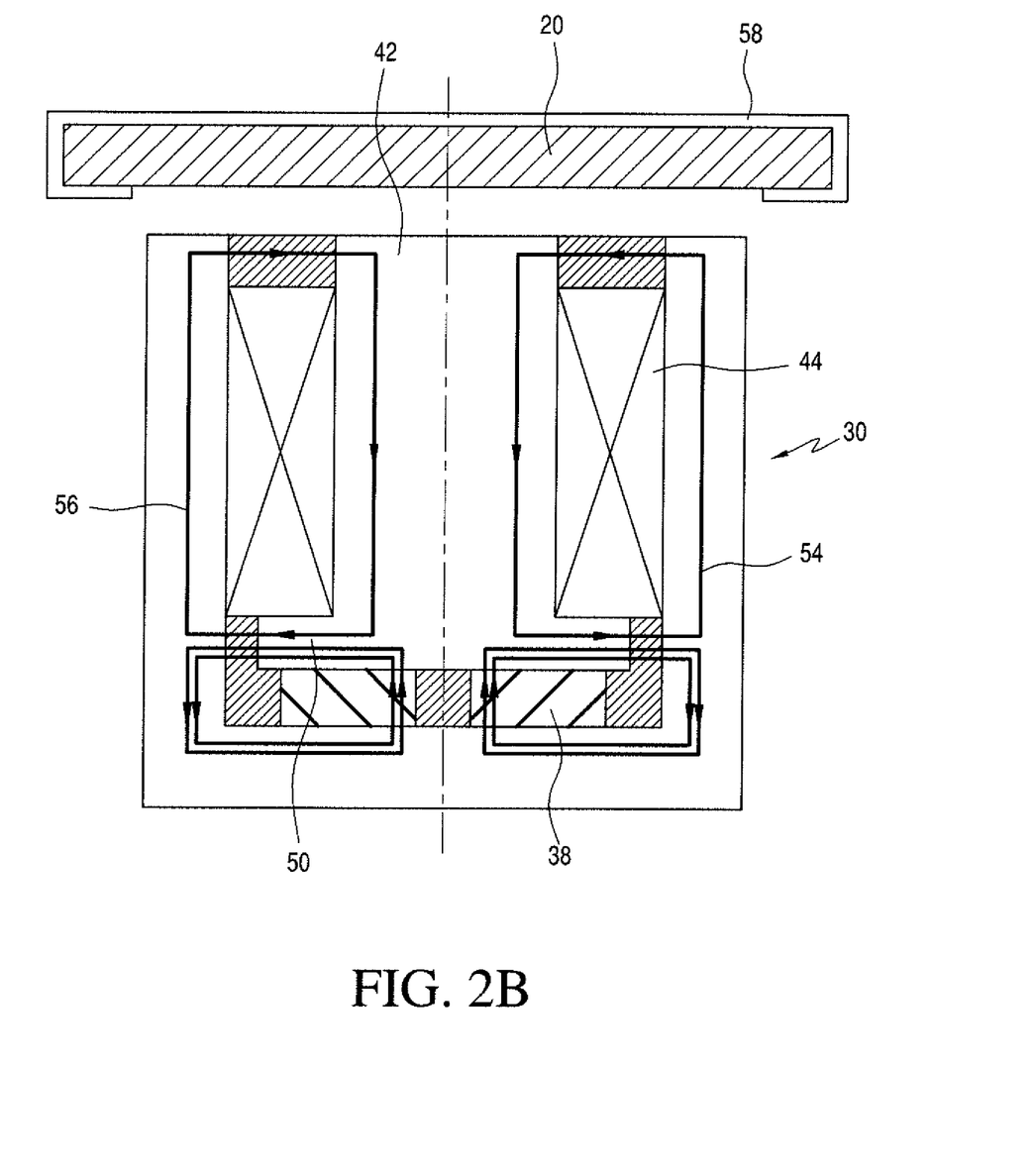

FIGS. 2A and 2B show a schematic of the electromagnetic switching actuator 30, which is rotationally symmetrical about its longitudinal axis. Here, FIG. 2A shows the deenergized state of the switching actuator 30, and FIG. 2B shows the energized state of the switching actuator 30.

The switching actuator 30 will first be explained on the basis of FIG. 2A. The switching actuator 30 includes an annular permanent magnet 38, a first ferromagnetic element in the form of a pot 40, and a second ferromagnetic element in the form of a ferromagnetic core 42. Furthermore, the switching actuator 30 includes an electrically conductive coil 44 (the line supplying electrical current to the coil and the line conducting electrical current from the coil are not shown). The annular permanent magnet 38 is arranged on the base of the pot 40. The ferromagnetic core 42 is mounted on the permanent magnet 38. The core 42 terminates, at its top end, with the pot 40, and is dimensioned in terms of its width such that a gap remains between the inner wall 46 of the pot 40 and the lateral surface 48 of the core 42. The coil 44 is wound around the core 42 and fills out the gap between the inner wall 46 and the lateral surface 48.

The core 42 includes, at its lower end, a collar 50 which projects radially outward beyond the lateral surface 48 of the core 42. The gap between the inner wall 46 of the pot 40 and the lateral surface 48 of the core 42 is thus considerably smaller in the region of the collar 50 than in the remaining region of the core 42. The coil 44 rests on the collar 50. The remaining cavities in the pot 40 are sealed by means of a sealing compound 52.

The mode of operation of the switching actuator 30 in the deenergized state will be described below: the permanent magnet 38 is configured such that the magnetic field in the interior thereof runs from bottom to top parallel to the longitudinal axis of the switching actuator 30 (indicated by the arrows in the permanent magnet 38). When the switching actuator is in the deenergized state, the magnetic field generated by the permanent magnet 38 is conducted in the interior of the coil 44 through the ferromagnetic core 42, parallel to the longitudinal axis of the switching actuator 30. At the top end of the pot, the magnetic field lines emerge from the pot 40 and are diverted in the ferromagnetic diaphragm 20 as shown in FIG. 2A.

Radially at the outside, the magnetic field lines enter into the pot 40 of the switching actuator 30 and run parallel to the longitudinal axis of the switching actuator 30 to the bottom end of the pot 40. Finally, the magnetic field lines are diverted in the base of the pot 40 as shown in FIG. 2A, and finally arrive at the permanent magnet 38 again. The magnetic field lines originating from the permanent magnet 38 are thus closed via the core 42, the ferromagnetic diaphragm 20 and the pot 40. Owing to the closed magnetic field lines, a magnetic holding force is exerted on the diaphragm 20. The magnetic holding force fixes the diaphragm 20 in the rest position in which it rests on the pot 40 as shown in FIG. 2A. The radially outer ends of the diaphragm 20 then rest on the stop 24 of the lower part 14 of the partition wall 10, as shown in FIG. 1.

In conjunction with FIG. 2B, it will be described below how the switching actuator 30 performs in the energized state. An electrical current is conducted through the coil 44 in such a manner that a magnetic field is built up by the coil 44, this magnetic field being indicated by the arrows 54 and 56. The magnetic field of the coil 44 runs, in the interior thereof, through the core 42 from the top end to the bottom end of the pot 40. In the pot 40, the magnetic field generated by the coil 44 runs from bottom to top, as is also indicated by the magnetic field lines 54 and 56.

The magnetic field lines (54, 56) are closed at their bottom end via the collar 50 and at their top end via the sealing compound 52. The magnetic field lines (54, 56) generated by the energized coil 44 thus run, in terms of their orientation, in the opposite direction to the magnetic field lines generated by the permanent magnet 38 as shown in FIG. 2A. This has the effect that the magnetic field lines shown in FIG. 2A are displaced by the magnetic field lines (54, 56) of the coil 44 and can no longer run through the core 42 into the diaphragm 20. Instead, the magnetic field lines originating from the permanent magnets 38 are short-circuited via the collar 50, and thus run from the permanent magnets 38, through the collar 50 into the pot 40, through the base of the pot 40, and from there back into the permanent magnet 38, as shown in FIG. 2B.

As a result of this defined short-circuiting of the magnetic field lines via the collar 50 of the core 42, the magnetic holding force of the permanent magnet is reduced to such an extent that the permanent magnet 38 can no longer fix the diaphragm 20 in its rest position. The diaphragm 20 is also not fixed in its rest position by the magnetic field of the coil 44, because the magnetic field is too weak. The diaphragm 20 is thus released for a movement in the longitudinal direction of the mount (see FIG. 1).

The switching of the switching actuator 30 from the deenergized state into the energized state and vice versa is performed as required by a control unit of the motor vehicle into which the engine mount is installed.

The ferromagnetic diaphragm 20 is preferably embedded into a rubber layer 58. Furthermore, the switching actuator 30 shown in FIGS. 2A and 2B is arranged in the engine mount 2 (see FIG. 1) in such a way that the coil 44 is situated between the diaphragm 20 and the permanent magnet 38, and the longitudinal direction of the pot 40 runs parallel to the longitudinal direction of the mount 2.

Figure 3A:
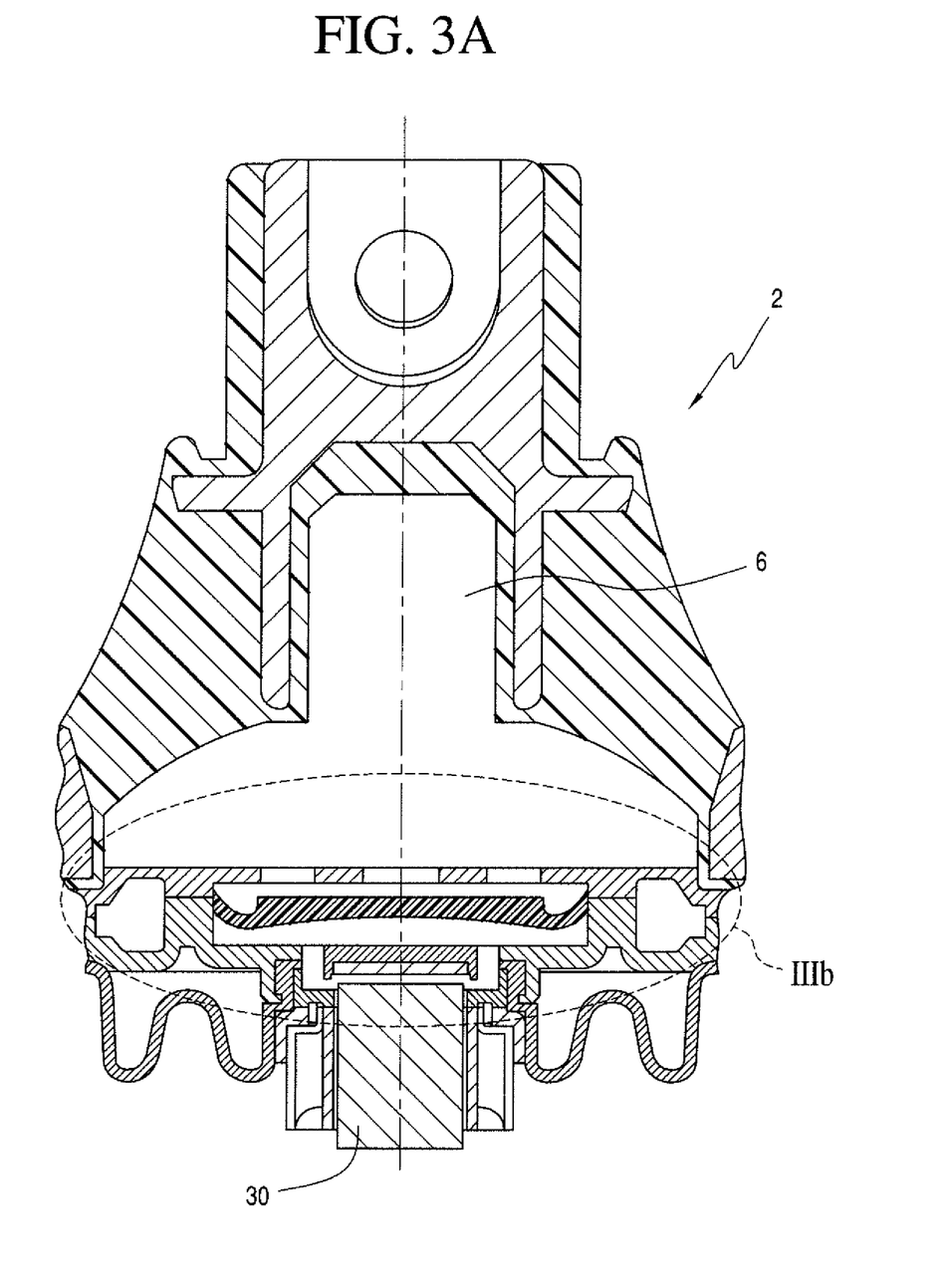
FIGS. 3A and 3B show a switchable mount wherein the switching actuator is in the energized state; and,
  FIG. 4 shows a section along the line IV/IV in FIG. 3B.
Figure 3B:
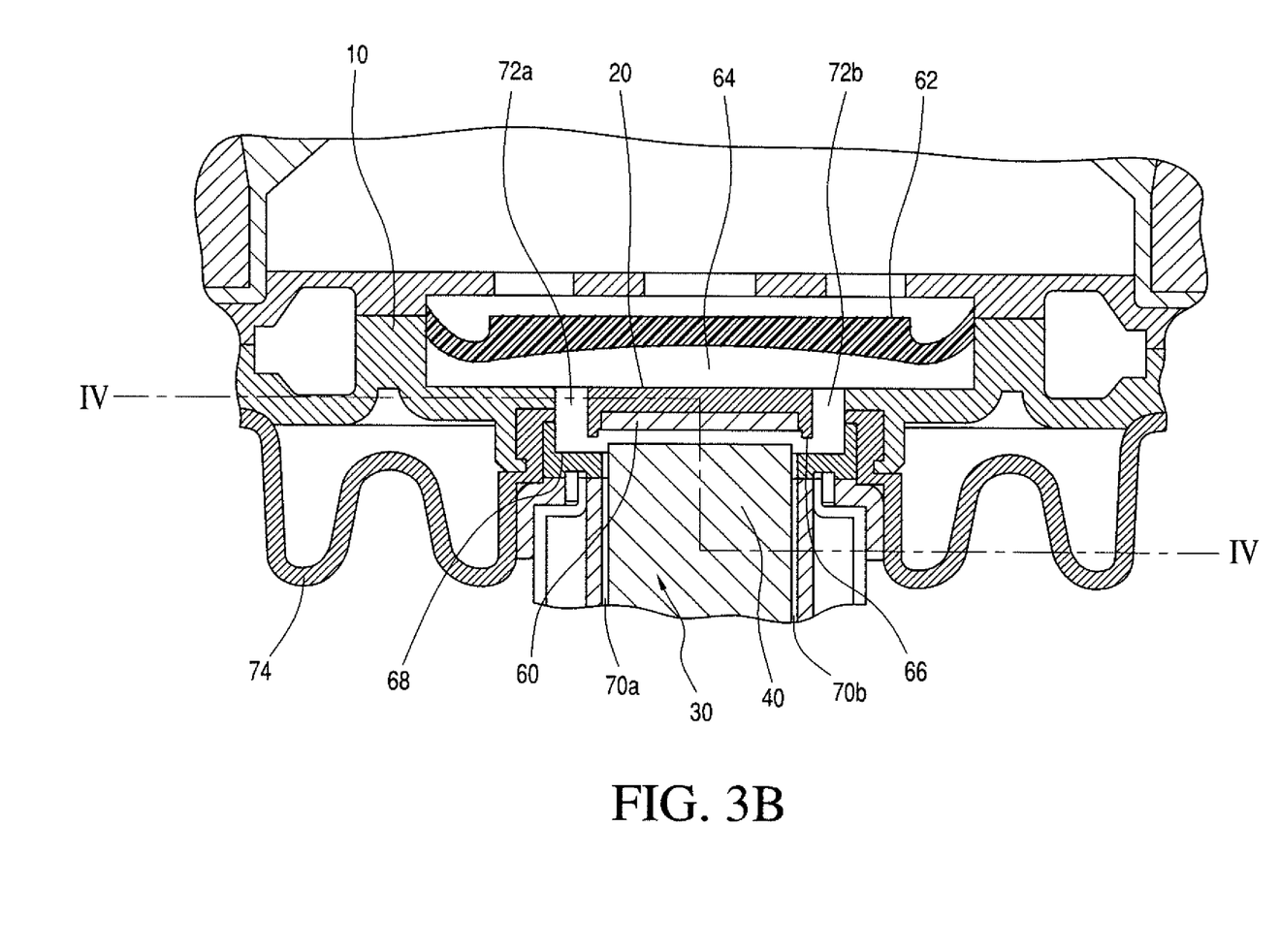

FIGS. 3A and 3B show an engine mount 2 having a switching actuator 30. The switching actuator 30 may be of any desired construction. However, the switching actuator 30 is preferably of the same construction as that which has been explained in conjunction with FIGS. 1 to 2B. In the following description of the figures, reference is made to FIG. 3B, which shows an enlarged detail of FIG. 3A. The partition wall 10 of the engine mount 2 comprises a first diaphragm 20 which can be controlled via the switching actuator 30. The diaphragm 20 includes a circular metal plate 60 which is embedded into the elastomer of the diaphragm 20. Furthermore, the first diaphragm 20 is an integral part of the rolling diaphragm 74 which delimits the compensation chamber 8 to the outside.

In addition to the first diaphragm 20, the partition wall 10 includes a second diaphragm 62 which is acted on by the hydraulic fluid in the working chamber 6, which can be deflected in the longitudinal direction of the engine mount 2 and via which the volume of the working chamber 6 (see FIG. 3A) can be influenced. An air chamber 64 is arranged between the first diaphragm 20 and the second diaphragm 62. When the switching actuator 30 is in the deenergized state, the air chamber 64 is closed off in an air-tight manner with respect to the atmosphere. In the event of a deformation of the working chamber 6 (see FIG. 3A), the second diaphragm 62 then has to act counter to the air pressure in the air chamber 64, such that the engine mount 2 is in a hard setting. In the energized state of the switching actuator 30, the air chamber 64 is connected to the atmosphere. In the event of a change in volume of the working chamber 6, the second diaphragm 62 then has to act merely counter to the atmospheric air pressure, such that the engine mount 2 is in a soft setting.

It will be described below how the air chamber 64 can be closed off in an air-tight manner with respect to the atmosphere and how the air chamber 64 can be connected to the atmosphere. Here, and referring to FIG. 3B, the state in which the air chamber 64 is closed off in an air-tight manner with respect to the atmosphere will first be described. In this situation, an annular sealing lip 66 of the first diaphragm 20 rests on a sealing seat 68 which surrounds the switching actuator 30. In the radially inner region of the sealing lip 66, there are situated ventilation slots 70a and 70b which run radially along the outside of the pot 40 of the switching actuator 30 in the longitudinal direction of the engine mount 2. The ventilation slots 70a and 70b are connected to the atmosphere. Radially outside the sealing lip 66, the diaphragm 20 includes windows (72a, 72b). When the actuator is in the deenergized state, that is to say when the diaphragm 20 is resting with the sealing lip 66 on the sealing seat 68, a connection of the windows (72a, 72b) to the ventilation slots (70a, 70b) is blocked by the annular sealing lip 66. Accordingly, no air can escape from the air chamber 64 into the atmosphere via the ventilation slots (70a, 70b).

When the switching actuator 30 is in the current-conducting state (this state is shown in FIG. 3B), the sealing lip 66 is lifted from the sealing seat 68 such that the air chamber 64 is connected to the atmosphere via the windows (72a, 72b) and via the ventilation slots (70a, 70b).

Figure 4:
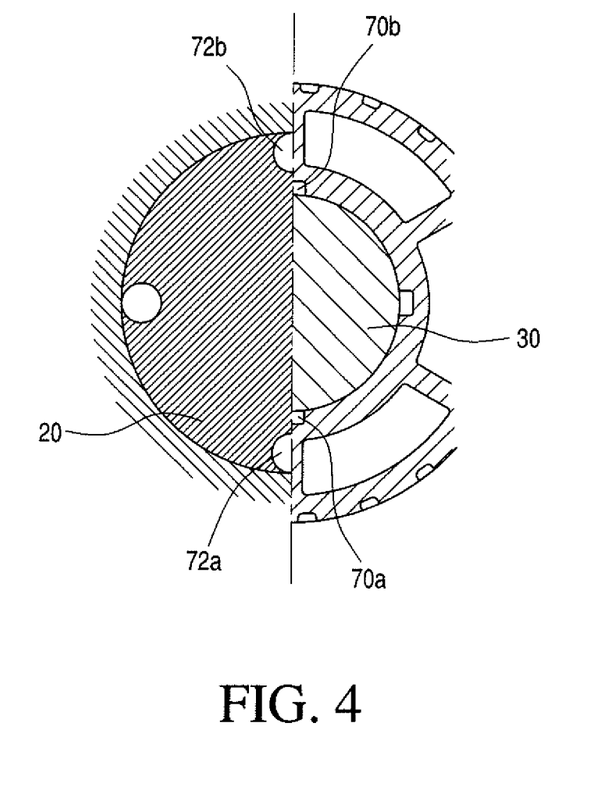

FIG. 4 shows a section along the line IV/IV. The diaphragm 20 includes, distributed over its circumference, a plurality of windows (72a, 72b) (the diaphragm 20 preferably includes at least four windows of which three are shown). Furthermore, a plurality of ventilation slots (70a, 70b) are arranged so as to be distributed over the circumference in the direct radial vicinity of the switching actuator 30. It is preferable for at least four ventilation slots (three are shown in FIG. 4) to be arranged over the entire circumference in the direct vicinity of the switching actuator 30. The windows 72 in the diaphragm 20 and the ventilation slots are dimensioned such that the total cross-sectional area of the windows is greater than the total cross-sectional area of the ventilation slots. In this manner, the diaphragm 20 is prevented from being pressed against the sealing seat 68 by the air flow when the air escapes from the air chamber 64 into the atmosphere via the windows and the ventilation slots.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

2 Engine mount
4 Lug

6 Working chamber
8 Compensation chamber
10 Partition wall
12 Upper part
14 Lower part
16 Annular duct
18 Bypass duct
20 Diaphragm
22 Stop
24 Stop
26 Opening
28 Annular duct
30 Switching actuator
32 Decoupling diaphragm
34 Windows
36 Windows
38 Permanent magnet
40 Pot
42 Core
44 Coil
46 Inner wall
48 Lateral surface
50 Collar
52 Sealing compound
54 Magnetic field line
56 Magnetic field line
58 Rubber layer
60 Metal plate
62 Diaphragm
64 Air chamber
66 Sealing lip
68 Sealing seat
70a,b Ventilation slot
72a,b Windows
74 Rolling diaphragm

What is claimed is:

1. A switchable, hydraulic damping mount defining a first longitudinal direction comprising:
    a working chamber defining a first volume and configured to be filled with a hydraulic fluid;
    a channel;
    a compensation chamber defining a second volume configured to be connected to said working chamber via said channel;
    a partition wall configured to separate said working chamber from said compensation chamber;
    a first diaphragm arranged in said partition wall in such a manner so as to be deflectable in the first longitudinal direction;
    a switching actuator configured to control said first diaphragm and having a first state in which said first diaphragm is fixed in a rest position and a second state in which said first diaphragm is released for a movement in the first longitudinal direction;
    a second diaphragm arranged in said partition wall and configured to be deflectable and influence said first volume of said working chamber;
    an air chamber arranged between said first diaphragm and said second diaphragm and configured to be closed to the atmosphere when said switching actuator is in said first state and to be connected to the atmosphere when said switching actuator is in said second state;
    said switching actuator having a first member configured as an integral part of said first diaphragm and being deflectable therewith between a first position corresponding to said first state of said switching actuator and a second position corresponding to said second state of said switching actuator wherein said air chamber is connected to the atmosphere;
    said switching actuator having a second member coacting with said first member to move said first member with said first diaphragm between said first and second positions;
    a sealing seat;
    said first diaphragm having an annular sealing lip;
    said switchable mount defining at least one ventilation slot via which said air chamber can be connected to the atmosphere;
    said first diaphragm having at least one window via which a connection of said air chamber to said ventilation slot is enabled;
    said first state of said switching actuator being a deenergized state thereof; and,
    said first diaphragm being configured to bear against said sealing seat with said annular sealing lip so as to cause said connection from said window to said ventilation slot to be blocked for air in said air chamber.

2. The switchable mount of claim 1, wherein:
    said switching actuator has a pot; and,
    said ventilation slot extends at a location radially at the outside of said pot.

3. A switchable, hydraulic damping mount defining a first longitudinal direction comprising:
    a working chamber defining a first volume and configured to be filled with a hydraulic fluid;
    a channel;
    a compensation chamber defining a second volume configured to be connected to said working chamber via said channel;
    a partition wall configured to separate said working chamber from said compensation chamber;
    a first diaphragm arranged in said partition wall in such a manner so as to be deflectable in the first longitudinal direction;
    a switching actuator configured to control said first diaphragm and having a first state in which said first diaphragm is fixed in a rest position and a second state in which said first diaphragm is released for a movement in the first longitudinal direction;
    a second diaphragm arranged in said partition wall and configured to be deflectable and influence said first volume of said working chamber;
    an air chamber arranged between said first diaphragm and said second diaphragm and configured to be closed to the atmosphere when said switching actuator is in said first state and to be connected to the atmosphere when said switching actuator is in said second state;
    said switching actuator having a first member configured as an integral part of said first diaphragm and being deflectable therewith between a first position corresponding to said first state of said switching actuator and a second position corresponding to said second state of said switching actuator wherein said air chamber is connected to the atmosphere;
    said switching actuator having a second member coacting with said first member to move said first member with said first diaphragm between said first and second positions;
    a sealing seat;
    said first diaphragm having an annular sealing lip;
    said switchable mount defining a plurality of ventilation slots via which said air chamber can be connected to the atmosphere;

said first diaphragm having a plurality of windows via which a connection of said air chamber to said ventilation slots is enabled;

said first state of said switching actuator being a deenergized state thereof;

said first diaphragm being configured to bear against said sealing seat with said annular sealing lip so as to cause said connection from said windows to said ventilation slots to be blocked for air in said air chamber;

said ventilation slots conjointly defining a first total cross-sectional area;

said windows conjointly defining a second total cross-sectional area; and, said second total cross-sectional area being greater than said first total cross-sectional area.

4. A switchable, hydraulic damping mount defining a first longitudinal direction comprising:

a working chamber defining a first volume and configured to be filled with a hydraulic fluid;

a channel;

a compensation chamber defining a second volume configured to be connected to said working chamber via said channel;

a partition wall configured to separate said working chamber from said compensation chamber;

a first diaphragm arranged in said partition wall in such a manner so as to be deflectable in the first longitudinal direction;

a switching actuator configured to control said first diaphragm and having a first state in which said first diaphragm is fixed in a rest position and a second state in which said first diaphragm is released for a movement in the first longitudinal direction;

a second diaphragm arranged in said partition wall and configured to be deflectable and influence said first volume of said working chamber;

an air chamber arranged between said first diaphragm and said second diaphragm and configured to be closed to the atmosphere when said switching actuator is in said first state and to be connected to the atmosphere when said switching actuator is in said second state;

said switching actuator having a first member configured as an integral part of said first diaphragm and being deflectable therewith between a first position corresponding to said first state of said switching actuator and a second position corresponding to said second state of said switching actuator wherein said air chamber is connected to the atmosphere;

said switching actuator having a second member coacting with said first member to move said first member with said first diaphragm between said first and second positions;

said first member being ferromagnetic;

said switching actuator being an electromagnetic switching actuator;

said switching actuator having a deenergized state and an energized state;

said second member of said switching actuator being configured to exert a magnetic holding force on said first member and fix said first diaphragm in said rest position when said switching actuator is in said deenergized state;

said switching actuator being further configured to reduce said magnetic holding force to such an extent that said first diaphragm is released for said movement in the first longitudinal direction;

said second member of said switching actuator having a permanent magnet, a first ferromagnetic element, a second ferromagnetic element, an electrically conductive coil configured to have current flow therein when said switching actuator is in said energized state;

said permanent magnet having a magnetic flux originating therefrom which is, when said switching actuator is in said energized state, configured to be conducted through said first member in said first diaphragm via said first and second ferromagnetic elements such that said first diaphragm via said first member is attracted by said magnetic holding force exerted by said permanent magnet;

said magnetic flux of said permanent magnet being further configured to be diverted in such a manner that said magnetic flux is not guided through said first member integral with said diaphragm so that said magnetic holding force exerted by said permanent magnet is reduced such that said first diaphragm via said first member is released for a movement in the first longitudinal direction;

said first ferromagnetic element being a pot of ferromagnetic material having a base and defining a second longitudinal direction;

said permanent magnet having a magnetic field and being arranged on said base of said pot such that said magnetic field is oriented in said second longitudinal direction;

said second ferromagnetic element being a ferromagnetic core defining a longitudinal axis and being arranged above said permanent magnet such that said longitudinal axis is aligned with the second longitudinal direction;

said ferromagnetic core and said pot conjointly defining a gap therebetween;

said coil being wound around said longitudinal axis of said ferromagnetic core; and, said switching actuator being aligned in said mount so as to cause said coil to be disposed between said first diaphragm and said permanent magnet and so as to cause said second longitudinal direction of said pot to run parallel to the first longitudinal direction.

5. The switchable mount of claim 4, wherein said switching actuator further comprises an electrically insulating compound cast into said gap between said pot and said core.

* * * * *